UNITED STATES PATENT OFFICE.

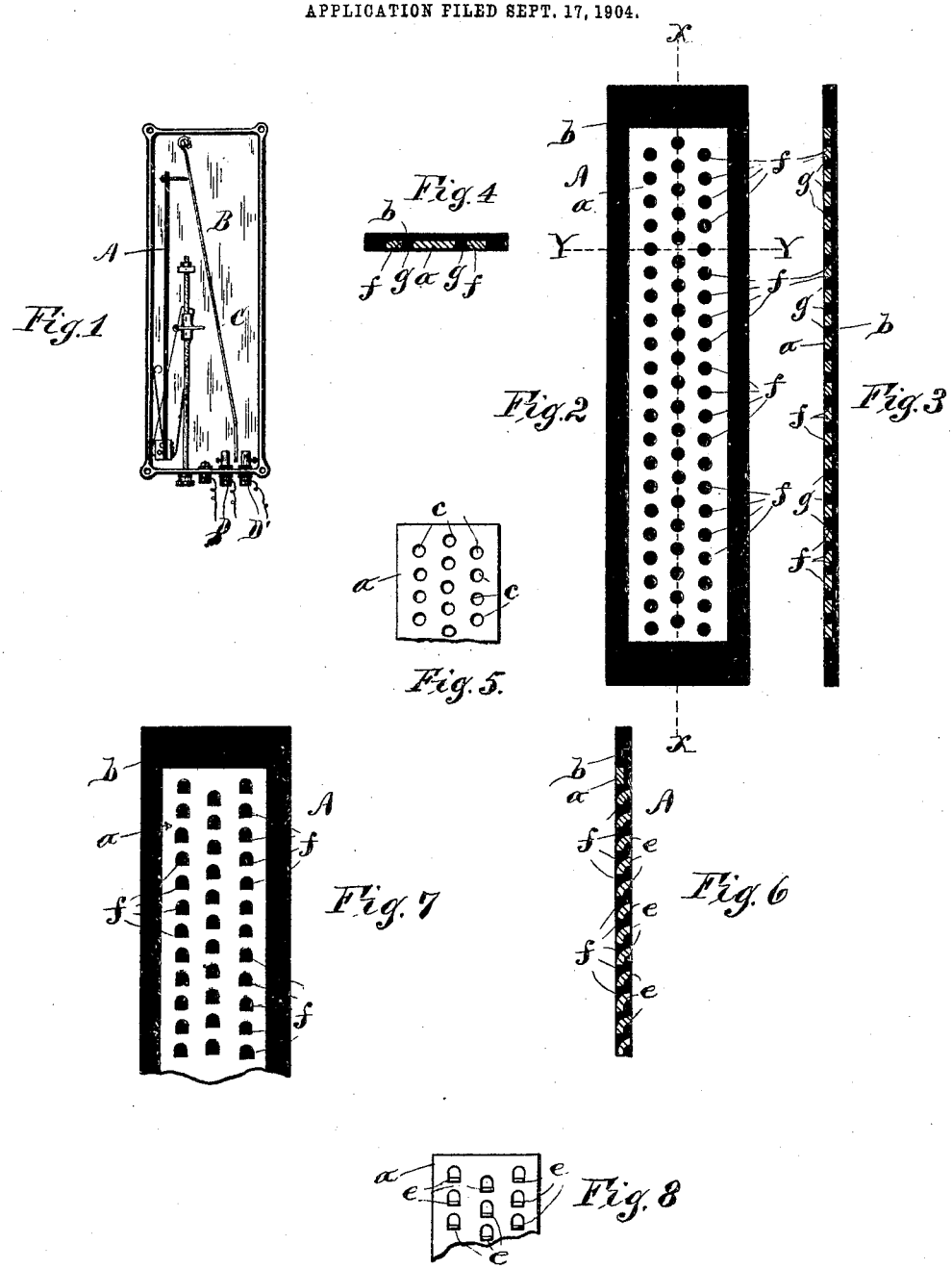

CHARLES D. HOWARD, OF SYRACUSE, NEW YORK.

THERMOSTATIC BAR.

No. 793,413. Specification of Letters Patent. Patented Aug. 29, 1905.

Application filed September 17, 1904. Serial No. 224,781.

*To all whom it may concern:*

Be it known that I, CHARLES D. HOWARD, of Syracuse, in the county of Onondaga, in the State of New York, have invented new and useful Improvements in Thermostatic Bars, of which the following, taken in connection with the accompanying drawings, is a full, clear, and exact description.

This invention pertains to thermo-electric devices in which the electrical appliances are controlled by a thermostatic bar formed of two permanently-united plates of relatively different expansive capacities. In some cases these plates are composed of different kinds of metals, and in other instances one plate is composed of metal and the other of a non-metallic material, usually hard rubber. It is to this latter form of thermostatic bar to which the present invention is specially related, the main object being to unite the two plates in a simple and inexpensive manner by dispensing with the use of screws, rivets, &c., usually employed for the purpose.

To this end the invention consists in the novel construction of the thermostatic bar, as hereinafter fully described, and set forth in the claims.

In the accompanying drawings, Figure 1 is a face view of a part of a thermo-electric apparatus equipped with my improved thermostatic bar. Fig. 2 is an enlarged detail front view of the thermostatic bar. Figs. 3 and 4 are longitudinal and transverse sections taken on lines X X and Y Y, respectively, in Fig. 2. Fig. 5 is a detail face view of a portion of the metal plate. Fig. 6 is a longitudinal section of a bar, illustrating a modification of my invention. Fig. 7 is a face view of a portion of the bar, showing a modification of the means by which the metal plate is interlocked with the hard-rubber plate; and Fig. 8 is a face view of a portion of the metal plate, showing the lugs struck up therefrom and in condition to be united with the rubber plate.

Referring to said drawings, A represents the thermostatic bar, which may be used in various styles of apparatus. In the present case I have shown the bar supported on a suitable case B and arranged to control an electric circuit-closing bar C, fastened to the case and disposed between two electric contacts D D'. Inasmuch as these parts do not pertain to the present invention, a further description of the same is unnecessary.

The thermostatic bar A is composed of plates $a$ and $b$ of materials having different expansive capacities and placed contiguous face to face. I prefer, however, to form the plate $a$ of a suitable metal and the plate $b$ of hard rubber. The said plate $a$ is formed from a sheet-metal blank and is provided with a series of apertures $c\ c$. These apertures, as shown in Fig. 5, may be produced by means of the well-known drill or punch or they may be produced by making incisions in the blank and then bending the cut portions to form tongues $e\ e$, as shown in Fig. 8 of the drawings. In either case the rubber plate is applied to the metal plate by the well-known process of vulcanization, whereby the said metal plate is embedded in the rubber and the latter caused to fill the apertures $c\ c$, as indicated at $f\ f$ in Figs. 3 and 6 of the drawings. These fillings $f\ f$ form studs when the rubber becomes hard, whereby the two plates $a\ b$ are interlocked. When the metal plate shown in Figs. 2, 3, 4, and 5 is used, I prefer to bevel the outer edges of the apertures $c\ c$, as indicated at $g\ g$, to insure a firm hold of the studs $f\ f$ on the plate.

By using the modified form of plate $a$ an additional hold of the plate on the rubber plate is obtained by reason of the tongues $e\ e$ being embedded therein, as shown in Fig. 6.

It will be understood that the said apertures and tongues may be of any other suitable form.

What I claim is—

1. A thermostatic bar composed of two contiguous plates placed face to face and relatively of different expansive capacities, one plate being formed with projections by which it is locked to the other plate as set forth.

2. A thermostatic bar composed of a metallic plate and a non-metallic plate, one plate having integral means for uniting the same with the other as set forth.

3. A thermostatic bar composed of a metallic plate and a rubber plate united by integral studs and apertures as set forth.

4. A thermostatic bar composed of a metallic plate and a hard-rubber plate formed with interlocking means and united by vulcanization of the said rubber plate, as set forth.

5. A thermostatic bar composed of a metallic plate provided with apertures, and a non-metallic plate having integral studs projecting from one face and engaging said apertures and interlocking the plates, as set forth.

6. A thermostatic bar composed of a metallic plate provided with apertures, and a hard-rubber plate united by vulcanization of the latter and studs projecting from the rubber plate and interlocked with the said apertures, as set forth.

7. A thermostatic bar composed of a metallic plate provided with apertures and tongues projecting from one face, and a hard-rubber plate united therewith by vulcanization of the latter, the tongues being embedded in the rubber plate and studs formed on the latter and entering said apertures whereby the two plates are firmly interlocked, as set forth.

8. A thermostatic bar composed of two plates, relatively of two different expansive capacities, one plate being embedded in the other, and one plate having integral projections serving to lock the same with the other plate as set forth.

9. A thermostatic bar composed of a non-metallic plate and a metallic plate, one plate being embedded in the other, and one plate having integral projections serving to lock the same with the other plate as set forth.

10. A thermostatic bar composed of a hard-rubber plate and a metallic plate united by vulcanization of the former, the metallic plate being embedded in the rubber plate, as set forth.

11. A thermostatic bar composed of a metallic plate and a hard-rubber plate united by vulcanization of the latter, the former being embedded in said rubber plate and provided with apertures receiving studs produced on the rubber plate by said vulcanization, and thereby interlocking one plate with the other, as set forth.

CHARLES D. HOWARD. [L. S.]

Witnesses:
J. J. LAASS,
L. H. FULMER.